US008850553B2

(12) United States Patent
Novak et al.

(10) Patent No.: US 8,850,553 B2
(45) Date of Patent: Sep. 30, 2014

(54) SERVICE BINDING

(75) Inventors: Mark F. Novak, Newcastle, WA (US); Daniel Kaminsky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1161 days.

(21) Appl. No.: 12/209,489

(22) Filed: Sep. 12, 2008

(65) Prior Publication Data

US 2010/0071048 A1 Mar. 18, 2010

(51) Int. Cl.
*H04L 29/06* (2006.01)
*H04L 9/32* (2006.01)

(52) U.S. Cl.
CPC .................................. *H04L 63/08* (2013.01)
USPC ......... 726/12; 726/2; 726/3; 726/10; 713/153

(58) Field of Classification Search
None
See application file for complete search history.

(56) References Cited

U.S. PATENT DOCUMENTS

| | | | |
|---|---|---|---|
| 5,825,752 A | 10/1998 | Fujimori et al. | |
| 6,182,139 B1 | 1/2001 | Brendel | |
| 6,286,104 B1* | 9/2001 | Buhle et al. ....................... | 726/4 |
| 6,550,008 B1 | 4/2003 | Zhang et al. | |
| 6,952,768 B2 | 10/2005 | Wray | |
| 7,149,892 B2 | 12/2006 | Freed et al. | |
| 7,661,131 B1* | 2/2010 | Shaw et al. ....................... | 726/15 |
| 2002/0013848 A1 | 1/2002 | Rene Salle | |
| 2002/0157019 A1* | 10/2002 | Kadyk et al. .................. | 713/201 |
| 2002/0162030 A1* | 10/2002 | Brezak et al. ................. | 713/202 |
| 2003/0120948 A1* | 6/2003 | Schmidt et al. ............... | 713/200 |
| 2004/0111605 A1* | 6/2004 | Weber ............................ | 713/152 |
| 2004/0125959 A1* | 7/2004 | Beuque et al. ................ | 380/279 |
| 2005/0124288 A1 | 6/2005 | Karmi et al. | |
| 2005/0266798 A1* | 12/2005 | Moloney et al. .............. | 455/41.2 |
| 2006/0020787 A1* | 1/2006 | Choyi et al. ................... | 713/165 |
| 2006/0195899 A1 | 8/2006 | Ben-Shachar et al. | |
| 2007/0038853 A1* | 2/2007 | Day et al. ....................... | 713/153 |
| 2007/0058644 A1 | 3/2007 | Brahmbhatt et al. | |
| 2008/0056500 A1* | 3/2008 | Bradley et al. ................ | 380/279 |
| 2008/0282081 A1* | 11/2008 | Patiejunas ..................... | 713/153 |

FOREIGN PATENT DOCUMENTS

EP 1940085 * 7/2008 .............. H04L 12/46

OTHER PUBLICATIONS

N. Williams, "On Use of Channel Bindings to Secure Channels," Nov. 2007, Network Working Group, RFC 5056, 24 pages.*
Microsoft, "What is TLS/SSL", Updated Mar. 28, 2003, Accessed Jun. 6, 2013, Online: [http://technet.microsoft.com/en-us/library/cc784450(d=printer,v=ws.10).aspx].*
Asokan et al, "Man-in-the-Middle in Tunneled Authentication Protocols", retrieved at <<http://www.cs.cornell.edu/courses/cs619/2004fa/documents/163.pdf>>, Nov. 11, 2002, Proc Intl Workshop Security Protocols, 15 pgs.
Song et al, "Multiple-Channel Security Architecture and Its Implementation over SSL", retrieved at <<http://www.hindawi.com/Getpdf.aspx?doi=10.1155/WCN/2006/85495>>, EURASIP Journal on Wireless Communications and Networking, vol. 2006, Article ID 85495, 2006, 20 pgs.
Song et al, "Supporting End-to-End Security Across Proxies with Multiple-Channel SSL", retrieved at http://konstantin.beznosov.net/doc/papers/Supporting_End-to-End_Security_With_MC_SSL.pdf>>, Proc 19th IFIP (Intl Information Security Conf), Aug. 2004, 15 pgs.

* cited by examiner

*Primary Examiner* — Jung Kim
*Assistant Examiner* — Robert Leung
(74) *Attorney, Agent, or Firm* — Tony H. Azure; Andrew Sanders; Micky Minhas

(57) ABSTRACT

Embodiments for performing service binding between a client and a target server are disclosed. In accordance with one embodiment, a clear text client service binding value is received from a client at the target server, the client service binding value is compared to a server service binding value, and a communication channel is formed between the client and the target server when the client service binding value matches the server service binding value.

19 Claims, 7 Drawing Sheets

SERVICE BINDING

BACKGROUND

Channel binding is a method of enabling secured communication between a client computer and a server over a network by cryptographically binding together an outer channel, (e.g., a transport layer security (TLS) channel) with an inner channel, (e.g., NTLM, Kerberos). However, channel binding may have difficulty with "gateway transversal," where the server responsible for inner channel authentication is not the same server that is responsible for outer channel authentication. Channel binding also cannot be used when the outer secure channel does not exist (e.g., the traffic is sent unprotected over TCP/IP) or when outer channel does exist but does not support channel binding (e.g., IPSec).

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for service binding between a client computer and a network server. In various embodiments, service binding may address the limitations associated with channel binding. In one embodiment, creating a communication channel to a target server includes receiving a cryptographically protected client service binding value from a client at the target server, the client server binding value being available to the target server in clear text. The embodiment also includes comparing the client service binding value to a server service binding value, and forming a communication channel between the client and the target server when the client service binding value matches the server service binding value. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to embodiments of service binding between a client and a server to establish a secure communication channel in a network environment. Specifically, the embodiments described herein are directed to making a clear text service binding value from a client available to a target server. In various embodiments, the clear text service binding value may be derived from a persistent property of the target server. For example, but not as a limitation, the clear text service binding value may be a name recognized by the target server. The use of a persistent property of the target server as a clear text binding value may reduce the problem of built-in obsolesce and/or expiration associated with binding values derived from server certificates. The clear text service binding values may also enable the target server to implement service binding in conjunction with channel binding so that a secure communication channel may be established even in instances where channel binding cannot be established between the client and the server. Various examples of service binding are described below with reference to FIGS. 1-7.

Exemplary Schemes

Figure 1:
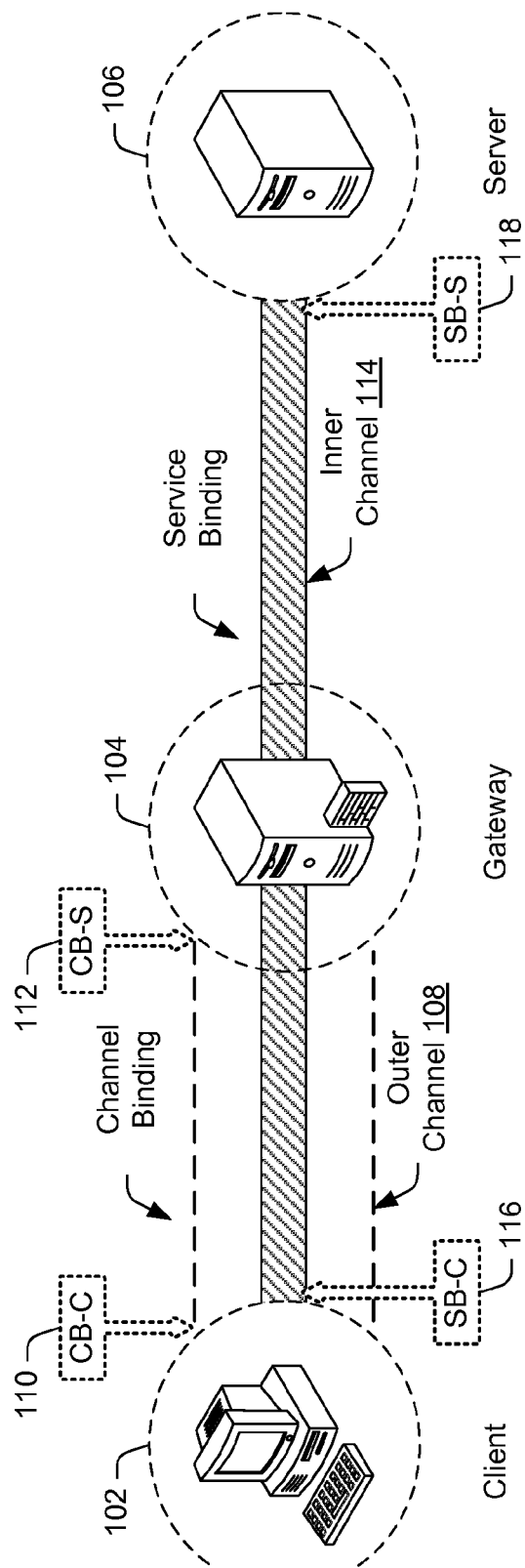
FIG. 1 is a block diagram illustrating an exemplary implementation of service binding in a network environment in conjunction with channel binding, in accordance with various embodiments.

FIG. 1 is a block diagram illustrating an exemplary implementation of service binding in a network environment 100 in conjunction with channel binding, in accordance with various embodiments. Generally speaking, channel binding cryptographically "binds" together an outer communication channel, such as a channel established based on the Transport Layer Security (TLS) protocol, with an inner communication channel, such as a communication channel established based on a NT LAN Manger (NTML) protocol, a Kerberos protocol, or a Digest protocol. The network environment 100 may include a client 102, a gateway 104, and a target server 106. The network environment 100 may further include at least one of a wide-area network (WAN) component, a local area network (LAN) component, and the like, over which one or more communication channels may be established. As used herein, a gateway refers to an intermediary server that is configured to pass network communication traffic between two networked computing devices, such as a client and a target server. For example, but not as a limitation, a gateway may be a proxy server, a web gateway server, or the like.

As shown in FIG. 1, an outer communication channel 108 may be established between the client 102 and the gateway 104. In at least one embodiment, the outer communication channel 108 may be established using a Transport Layer Security (TLS) protocol.

Once the outer communication channel 108 is established, the client 102 may establish an inner communication channel 114 with the target server 106 via the gateway 104. In various embodiments, the inner communication channel 114 may be created using one of a NT LAN Manger (NTML) protocol, a Kerberos protocol, or a Digest protocol.

Nevertheless, while it is possible to establish the inner communication 114, it is not possible to perform channel binding between the inner communication channel 114 and the outer communication channel 108 using channel binding values. As described above, channel binding is a software security technique that "binds" together an outer communication channel (e.g., a TLS protocol-based communication channel) with an inner channel communication (e.g., a NTML protocol-based communication channel) to prevent security threats such as authentication relay attacks.

In order to perform channel binding, it is necessary for the target server 106 to match a client channel binding (CB-C) value 110 of the client 102 to a server channel binding (CB-S) value 112 of the gateway 104. However, the CB-C value 110 and the CB-S value 112 are derived properties of the outer channel 108. Further, these channel binding values not readily transferrable to the target server 106 for the performance of channel binding.

Accordingly, service binding authentication techniques may be implemented on the inner communication channel 114 between the client 102 and the target server 106 as an alternative to channel binding. In this way, the inner communication channel 114 may be protected from security threats such as authentication relay attacks without relying exclusively on channel binding.

In various embodiments, following the creation of the inner communication channel 114, the client 102 may authenticate to the target server 106 over the inner communication channel using service binding techniques. During the authentication, the client 102 may initiate an authentication exchange with the target server 106. In at least one embodiment, the transfer of the authentication exchange from the client 102 to the target server 106 may be facilitated by the gateway 104, that is, a first gateway encountered by the client 102. In other words, the client 102 may initiate an authentication exchange with the gateway 104. In turn, the gateway 104 may relay the authentication exchange to the target server 106.

As part of the authentication exchange, the client 102 may transmit the clear text CB-C value 110 and a clear text client service binding (SB-C) value 116 to the target server 106 in cryptographically protected manner to make them safe from tampering by a man-in-the-middle (MITM). As used herein, "clear text" refers to a SB-C value, such as the SB-C value 116, not being irreversibly transformed into a different value via a one way function, e.g., a one-way hashed function that transforms an input into a hashed output.

The target server 106 may use the received CB-C value 110 to verify that the clear text SB-C value 116 is transmitted over a valid outer communication channel, such as outer communication channel 108. In at least one embodiment, the target server 106 may verify that the CB-C value 110 is non-default (e.g., the CB-C value 110 is not a default value that a client would use to indicate absence of an outer channel 108). Accordingly, the target server 106 may interpret a non-default CB-C value 110 as indicating that the client 102 has sent the authentication exchange over a valid outer channel and has verified that the gateway 104 is a legitimate recipient.

The clear text SB-C value 116 may include an identifier of a service that the client 102 intends to reach. In various embodiments, the identifier of the service may include a name that is associated with the service. For example, but not as a limitation, the identifier may be a name assigned to a gateway, such as the gateway 104, during the initial configuration of the gateway by a system administrator.

Furthermore, despite that fact that the SB-C value 116 is provided to the target server 106 in clear text, the SB-C value 116 is nevertheless cryptographically protected from tampering and/or forgery (e.g., man-in-the middle attack, also referred to as "MITM"). That is, in various embodiments, the SB-C value 116 may be cryptographically protected during conveyance from the client 102 to the target server 106 by a protocol of the authentication exchange that creates the inner communication channel 114. For example, but not as a limitation, the SB-C value 116 may be protected by one of a NT LAN Manger (NTML) protocol, a Kerberos protocol, or a Digest protocol.

In embodiments where the outer communication channel 108 is established based on the TLS protocol, the client 102 may derive the SB-C value 116 from a name of the gateway 104. In such embodiments, the client 102 may validate the certificate of the gateway 104 and then obtain the name of the gateway 104 for use as the SB-C value 116.

Upon receiving the SB-C value 116 that originated from the client 102, the target server 106 may compare the clear text SB-C value 116 with a server service binding (SB-S) value 118 stored in the target server 106. For example, but not as a limitation, the SB-S value 118 may be a name of the gateway 104. The gateway name may be stored on the target server 106 during the initial configuration of the server by a system administrator. As further described below, the client 102 may be authenticated to the target server 106 when the SB-C value 116 matches the SB-S value 118. Accordingly, the inner communication channel 114 may provide an authenticated (i.e., "service bound") communication pathway between the client 102 and the target server 106 when the client 102 is authenticated.

Figure 2:
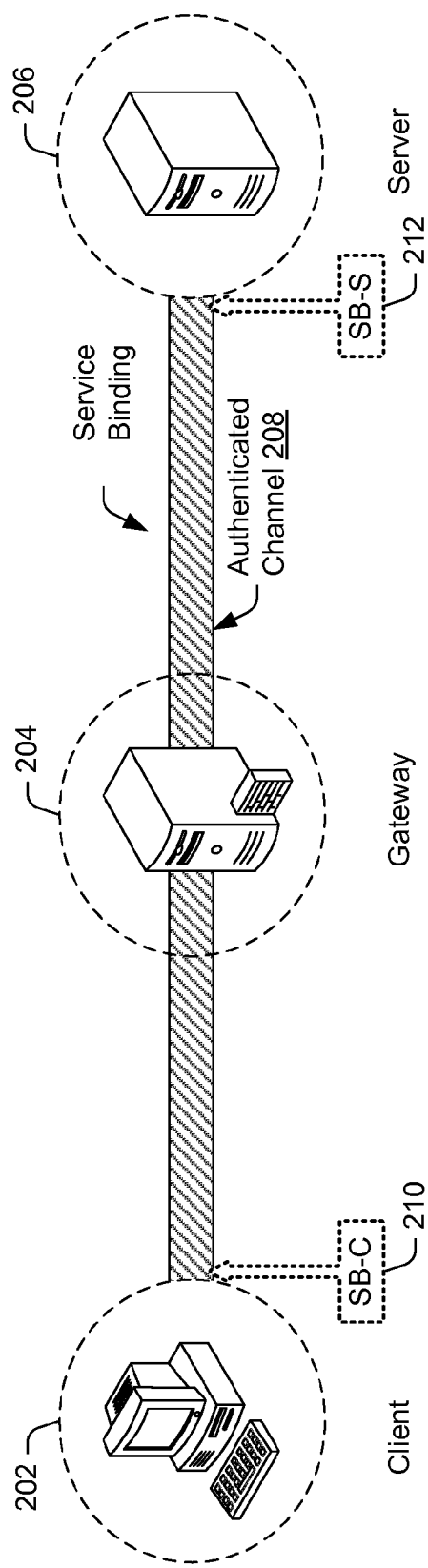
FIG. 2 is a block diagram illustrating an exemplary stand alone implementation of service binding in a network environment without an outer communication channel, in accordance with various embodiments.

FIG. 2 is a block diagram illustrating an exemplary stand alone implementation of service binding in a network environment 200, in accordance with various embodiments. The network environment 200 may include a client 202, a gateway 204, and a target server 206. The network environment 200 may further include at least one of a wide-area network (WAN) component, a local area network (LAN) component, and the like, over which one or more communication channels may be established.

As shown, the client 202 may establish a communication channel 208 with the target server 206 via the gateway 204. In various embodiments, the communication channel 208 may be created using one of a NT LAN Manger (NTML) protocol, a Kerberos protocol, or a Digest protocol.

In various embodiments, the client 202 may further authenticate to the target server 206 over the established communication channel 208. When this is the case, the communication channel 208 should be protected from security threats such as authentication relay attacks.

During the authentication, the client 202 may initiate an authentication exchange with the target server 206. In at least one embodiment, the transfer of the authentication exchange from the client 202 to the target server 206 may be facilitated by the gateway 204, that is, a first gateway encountered by the client 202. In other words, the client 202 may initiate an authentication exchange with the gateway 204. In turn, the gateway 204 may relay the authentication exchange to the target server 206.

As part of the authentication exchange, the client 102 may transmit a clear text client service binding (SB-C) value 210 to the target server 106 in cryptographically protected form. As used herein, "clear text" refers to a SB-C value, such as the SB-C value 210, not being irreversibly transformed into a different value via a one way function, e.g., a one-way hashed function that transforms an input into a hashed output.

The clear text SB-C value 210 may include an identifier of a service that the client 202 intends to reach. In various embodiments, the identifier of the service may include a name that is associated with the service. In one embodiment, the identifier may be a name assigned to a gateway, such as the target server 104, during the initial configuration of the gateway by a system administrator.

Furthermore, despite that fact that the SB-C value 210 is provided to the target server 206 in clear text, the SB-C value 210 is nevertheless protected from tampering and/or forgery (e.g., man-in-the middle attack, also referred to as "MITM"). That is, in particular embodiments, the SB-C value 210 may be protected during conveyance from the client 202 to the target server 206 by a protocol of the authentication exchange that creates the authenticated channel 208. For example, but not as a limitation, the SB-C value 210 may be protected by one of a NT LAN Manger (NTML) protocol, a Kerberos protocol, or a Digest protocol.

Upon receiving the SB-C value 210, the target server 206 may compare the clear text SB-C value 210 with a server service binding (SB-S) value 212 stored in the target server 206. For example, but not as a limitation, the SB-S value 212 may be a name of the gateway 204. The gateway name may be stored on the target server 206 during the initial configuration of the server by a system administrator. As further described below, the client 202 may be authenticated to the target server 206 when the SB-C value 210 matches the SB-S value 212. Once authenticated, the communication channel 208 between the target server 206 and the client 202 may be transformed into an authenticated (i.e., service bound) communication channel 208.

It will be appreciated that, while in certain embodiments the client 202 may establish a service bound communication channel 208 with the target server 206 via a gateway, such as the gateway 204, the client 202 may also directly establish a service bound communication channel with the target server 206 without routing the channel through an intermediate gateway.

Figure 3:
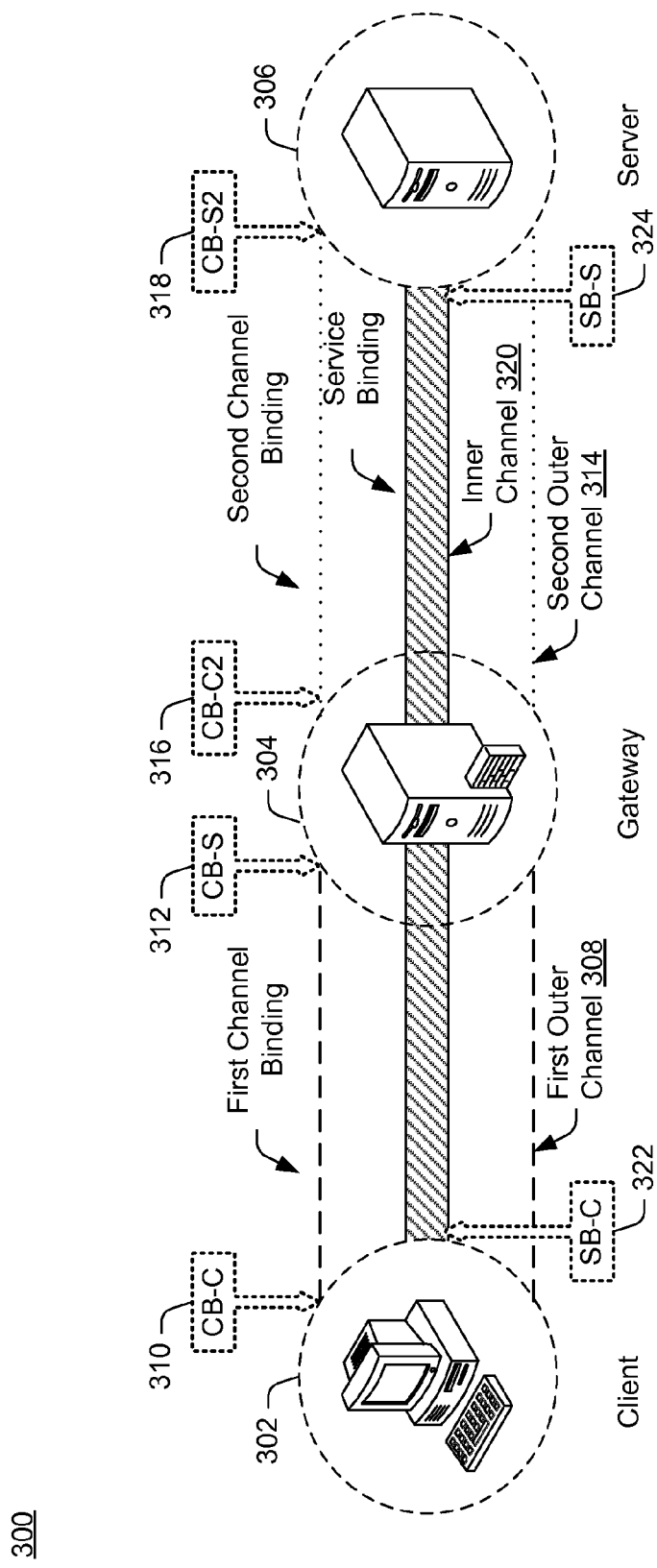
FIG. 3 is a block diagram illustrating an exemplary implementation of service binding in a network environment in conjunction with multiple channel bindings, in accordance with various embodiments.

FIG. 3 is a block diagram illustrating an exemplary implementation of service binding in a network environment 300 in conjunction with multiple channel bindings, in accordance with various embodiments. The network environment 300 may include a client 302, a gateway 304, and a target server 306. The network environment 300 may further include at least one of a wide-area network (WAN) component, a local area network (LAN) component, and the like, over which one or more communication channels may be established.

As shown in FIG. 3, a first outer communication channel 308 may be established between the client 302 and the gateway 304. In at least one embodiment, the first communication channel 308 may be established using a Transport Layer Security (TLS) protocol.

In some embodiments, a second outer communication channel 314 may be established by the gateway 304 to the target server 306. For instance, the gateway 304 may be a multi-hop gateway that redirects communication from the client 302 to the target server 306 via a secured communication channel. In at least one embodiment, the second outer communication channel 314 may also be created based on the Transport Layer Security (TLS) protocol or the IPSec protocol.

Once the first and second communication channels 308 and 314 are established, the client 302 may create an inner communication channel 320 with the target server 306. In various embodiments, the inner communication channel 320 may be created using one of a NT LAN Manger (NTML) protocol, a Kerberos protocol, or a Digest protocol.

Nevertheless, while it is possible to establish an inner communication channel 320, it is not possible to perform channel binding between the inner communication channel 320 and either the first communication channel 308 or the second communication channel 314.

As shown in FIG. 3, the first communication channel 308 may include the first client channel binding (CB-C) value 310, and the first server channel binding (CB-S) value 312 that are independently derived from the first communication channel 308 by the client 302 and the gateway 304, respectively. Likewise, the second communication channel 314 may include a second CB-C2 value 316 and a second CB-S2 value 318 that are independently derived from the second communication channel 314 by the gateway 304 and the server 306, respectively.

Similar to described above in FIG. 1, channel binding may be performed if a target server is able to match a known CB-S value to a CB-C value from a client. In this instance, it is not possible for the target server 306 to match the first CB-C value 310 to the second CB-S2 value 318, as they are derived from different communication channels. Thus, as described below, service binding may be implemented on the inner communication channel 320 between the client 302 and the server 306. In this way, the inner communication channel 320 may be protected from security threats without relying solely on channel binding. In various embodiments, following the creation of the inner communication channel 320, the client 302 may authenticate to the target server 306 using server binding techniques. During the authentication process, the client 302 may initiate an authentication exchange with the target server 306. As part of the authentication exchange, the client 302 may transmit the CB-C value 310 and a clear text client service binding (SB-C) value 322 to the target server 306 in cryptographically protected form. As used herein, "clear text" refers to a service binding value, such as the SB-C value 322, not being irreversibly transformed into a different value via a one way function, e.g., a one-way hashed function that transforms an input into a hashed output.

The target server 306 may use the received CB-C value 310 to verify that the clear text SB-C value 322 is transmitted over one or more valid outer communication channels, such as the first outer communication channel 308. In at least one embodiment, the target server 306 may verify that the CB-C value 310 is non-default (e.g., the CB-C value 310 is not a default value that a client would use to indicate absence of an outer channel 308). Accordingly, the target server 306 may interpret a non-default CB-C value 310 as indicating that the client 302 has sent the authentication exchange over a valid outer channel and has verified that the gateway 304 is the intended recipient.

The clear text SB-C value 322 may include an identifier of a service that the client 302 intends to reach. In various embodiments, the identifier of the service may include a name that is associated with the service. For example, but not as a limitation, the identifier may be a name assigned to a gateway server, such as the gateway 304, during the initial configuration of the gateway by a system administrator.

Furthermore, despite that fact that the SB-C value 322 is provided to the target server 306 in clear text, the SB-C value 322 is nevertheless cryptographically protected from tampering and/or forgery (e.g., man-in-the middle attack, also referred to as "MITM"). That is, in particular embodiments, the SB-C value 322 may be protected during conveyance from the client 302 to the target server 306 by a protocol of the authentication exchange that creates the inner communication channel 320. For example, but not as a limitation, the SB-C value 322 may be protected by one of a NT LAN Manger (NTML) protocol, a Kerberos protocol, or a Digest protocol.

In embodiments where the first outer communication channel 308 is implemented based on the TLS protocol, the client 302 may derive the SB-C value 322 from a name of the gateway. In such embodiments, the client 302 may validate the certificate of the gateway 304 and then obtain the name of the gateway 304 for use as the SB-C value 322. Upon receiving the SB-C value 322 that originated from the client 302, the target server 306 may compare the clear text SB-C value 322 with the server SB-S value 324 stored in the target server 306. For example, but as a limitation, the SB-S value 324 may be a name of the gateway 304. The gateway name may be stored on the target server 306 during the initial configuration of the server by a system administrator. As further described below, the client 302 may be authenticated to the target server 306 when the SB-C value 322 matches the SB-S value 324. Accordingly, the inner communication channel 320 may provide an authenticated (i.e., "service bound") communication pathway between the client 302 and the target server 306 when the client 302 is authenticated.

Figure 4:
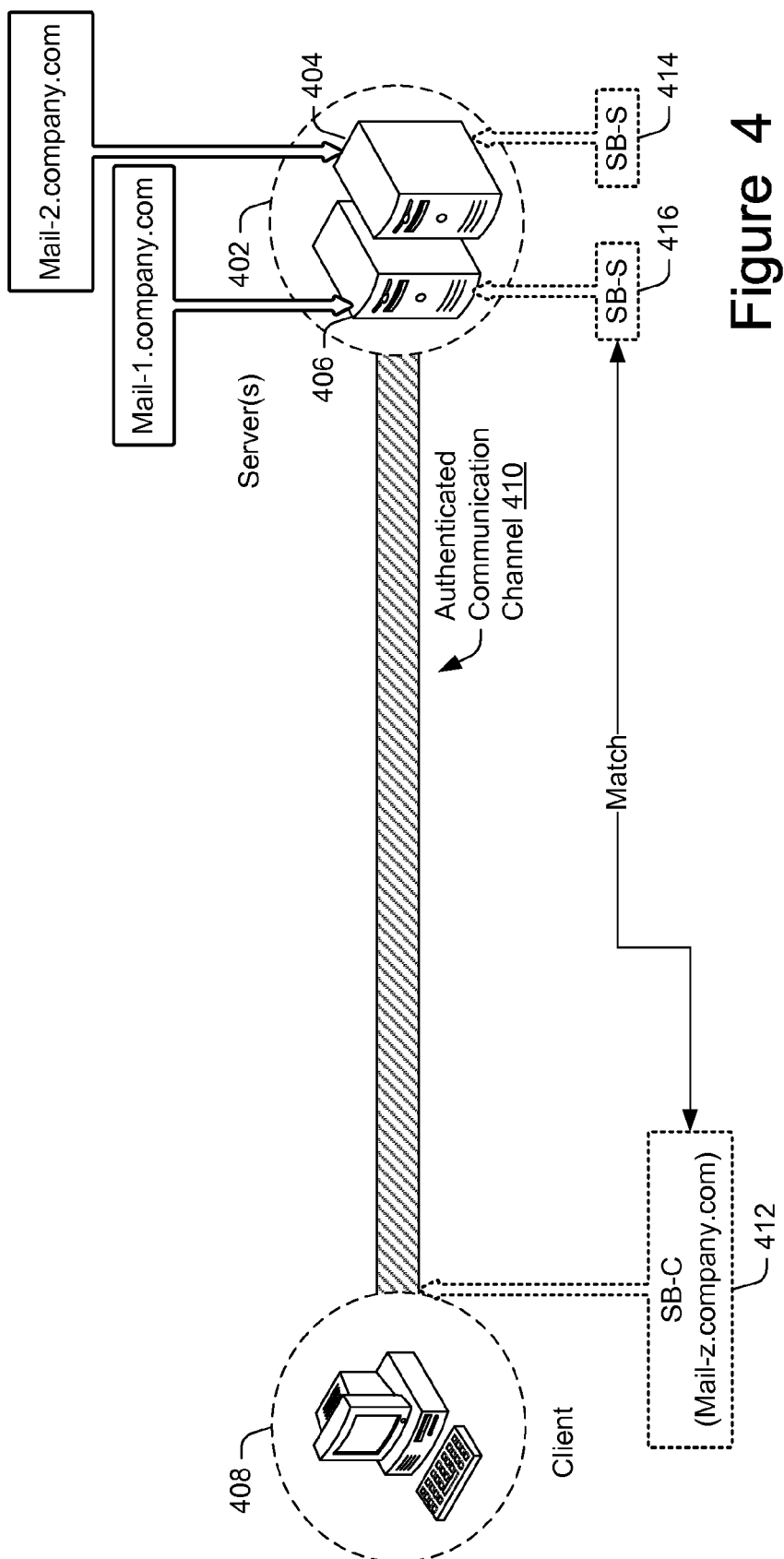
FIG. 4 is a block diagram illustrating an exemplary wild card matching of a client service binding value with one or more server service binding values, in accordance with various embodiments.
Figure 5:
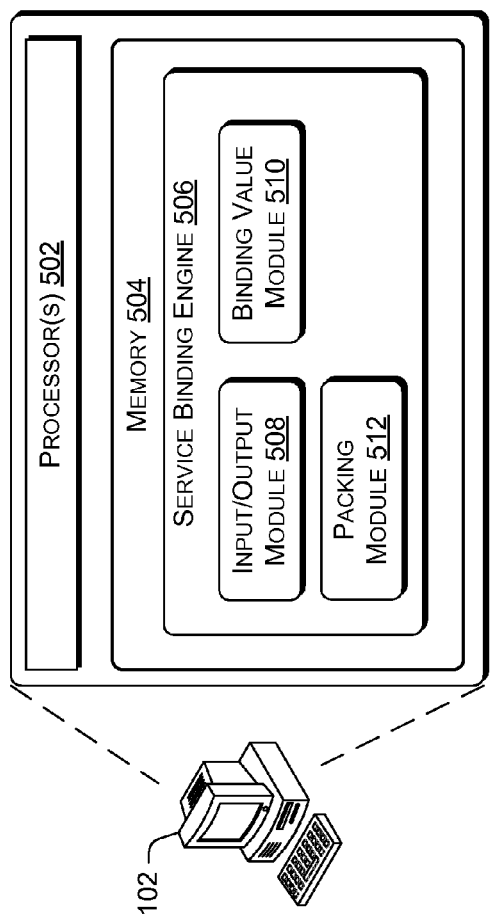
FIG. 5a is a block diagram illustrating selected components of an exemplary client that is configured to enable service binding, as implemented on a network environment, in accordance with various embodiments.
FIG. 5b is a block diagram illustrating selected components of an exemplary target server that is configured to enable service binding, as implemented on a network environment, in accordance with various embodiments.

FIG. 4 is a block diagram illustrating an exemplary wild card matching of a client service binding value with one or more server service binding values, in accordance with various embodiments. As described above, clear text client service binding values, such as SB-C 116 (FIG. 1) may be used during authentication of a client to a target server for the purpose of forming a service bound communication channel. Accordingly, the use of clear text client service binding values by the various clients may also enable wild card matching.

As shown in FIG. 4, one or more exemplary target servers 402 may include servers that are configured with wild card server service binding (SB-S) values. In some embodiments, the one or more exemplary target servers 402 may also perform similar functions. For example, but not as a limitation, the one or more servers 402 may include a first mail server 404 named "mail-1.company.com", and a second mail server 406 named "mail-2.company.com". The server 404 may have the SB-S value 414 "mail-x.company.com", and the server 406 may have an identical SB-S value 416 "mail-x.company.com", where "x" is a wild card representation.

The client 408 may establish an authenticated communication channel 410 with one of the target servers 402. During the establishment of the authenticated communication channel 410, the client 408 may initialize an authentication exchange to authenticate to one of the servers 402. In at least one embodiment, the client 408 may provide a clear text client service binding (SB-C) value 412 that enables wild card matching to both the SB-S value 414 and the SB-S value 416. For example, but not as a limitation, the client 408 may be configured to provide a clear text SB-C value 412, e.g., "mail-z.company.com". In various embodiments, as described above, the client 408 may obtain the clear text SB-C value 412 dynamically from another server, such as a gateway server.

In turn, each of the target servers 402 may be configured to receive the SB-C value 412 and compare it to a stored server service binding (SB-S) value. For example, the target server 404 may compare the clear text SB-C value 412 (e.g., mail-z.company.com) with a SB-S value 414 (mail-x.company.com). Likewise, the target server 406 may also compare the clear text SB-C value 412 with the SB-S value 416.

Since "x" in each of the SB-S value 414 and the SB-S value 416 is a wild card representation, the SB-C value 412 may match SB-S value 414 and/or SB-S value 416. Accordingly, the client 408 may use the SB-C value 412 to establish the authenticated communication channel 410 with any one of the exemplary servers 402, such as the server 404 or the server 406. In various embodiments, the establishment of the authenticated communication channel 410 with a particular one of the servers 402 may be dependent on the availability of each server (e.g., workload, available bandwidth, etc.).

It will be appreciated that while wild card matching of a clear text SB-C value to a SB-S value for the establishment of a authenticated communication channel has been illustrated with respect to the servers 404 and 406, the concept of wild type matching may be implemented a server farm that includes any plurality of servers, such as in a server farm that implements reverse proxy. Moreover, for the purpose of wild card matching, a SB-S value may include any number of wild card representations, in any combination, so long as the SB-C value is capable of being matched to a SB-S value of a server. Accordingly, the exemplary SB-C and SB-S values shown in FIG. 4 are illustrative rather than limiting.

Exemplary Components

FIG. 5a illustrates selected components of an exemplary client, such as client 102, which is capable of service binding. The client may include computer-program instructions being executed by a computing device, such as those in the computing device 700 described in FIG. 7. The client may include one or more processors 502 and a memory 504. The memory 504 may include volatile and nonvolatile memory, removable and non-removable media implemented in any method or technology for storage of information, such as computer-readable instructions, data structures, program modules or other data. Such memory may include, but is not limited to, random access memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The client may store program instructions in the memory 504. The program instructions, or modules, may include routines, programs, objects, components, and data structures that perform particular tasks or implement particular abstract data types. The modules may be implemented as software or computer-executable instructions that are executed by one or more processors 502. As shown in FIG. 5a, a service binding engine 506 may include an input/output module 508, a binding value module 510, and a packing module 512. However, it will be appreciated that the client may also include other modules that perform other functions (e.g., channel binding, gateway certificate validation, etc.).

The input/output module 508 may enable the client to establish communication with one or more servers, such as the target server 106 (FIG. 1). The input/output module 508 may be configured to use a wireless interface and/or a wired interface (not shown). The wireless interface may include, but is not limited to, a wireless RF interface (e.g. cellular, PCS, WiFi, Ultrawideband, Bluetooth, satellite transmissions, RFID, etc.), an infrared interface, and the like. The wired interface may include a direct I/O interface, such as a category 5 interface, a serial interface, a USB interface, and the like.

The binding value module 510 may be configured to generate client service binding (SB-C) values, such as the SB-C value 116. In embodiments where the client has previously establish a communication channel between a client and a gateway using the Transport Layer Security (TLS) protocol, the binding value module 510 may derive a SB-C value from a name of the gateway. The binding value module 510 may derive the SB-C after the client has validated the certificate of the gateway. In other embodiments, the binding value module 510 may provide a SB-C value that is obtained based on the service that a user intends to reach. For example, when a user intends to reach a particular website (e.g., http://www.website.com/), the binding value module 510 may consult one or more domain name servers (DNS) to obtain a name of the server that corresponds to the universal resource location (URL) of the particular website. In some instances, the obtained server named is the name of a gateway server, such as the gateway server 104. In various embodiments, the name of a server that is obtained by the binding value module 510 may be one of several forms. For example, but not as a limitation, the name may be in NetBIOS form, a full domain name form, and/or other standard naming conventions.

The packing module 512 may be configured to ensure that the SB-C values generated by the binding value module 510 are cryptographically protected from tampering and/or forgery in the authentication exchange to a target server. In embodiments where the client may attempt to authenticate to a server and establish an authenticated communication channel using the Kerberos protocol, the packing module 512 may package a SB-C value, such as SB-C value 116 (FIG. 1), in the protected canonical name (CNAME) record of a Kerberos service ticket. In other embodiments where the client may attempt to establish an authenticated communication channel using the NTLM protocol, the packing module 512 may format the SB-C value as a protected attribute value pair in an extensible field of a NTML authentication message. In additional embodiments where the client may attempt to establish an authenticated communication channel using Digest protocol, the packing module 512 may package the SB-C value as a protected directive of a Digest message.

FIG. 5b illustrates selected components of an exemplary target server, such as the target server 106. The target server may include computer-program instructions being executed by a computing device, such as those in the computing device 700 described in FIG. 7. The target server may include one or more processors 514 and memory 516. The memory 516 may include volatile and nonvolatile memory, removable and non-removable media implemented in any method or technology for storage of information, such as computer-readable instructions, data structures, program modules or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The target server may store program instructions in the memory 516. The program instructions, or modules, may include routines, programs, objects, components, and data structures that perform particular tasks or implement particular abstract data types. The modules may be implemented as software or computer-executable instructions that are executed by one or more processors 514. As shown in FIG. 5b, a service binding engine 518 may include an input/output module 520, an unpacking module 522, a comparison module 524, and a data storage module 526. However, it will be appreciated that the target server may also include other modules that perform other functions (e.g., channel binding).

The input/output module 520 may enable the target server to establish communication with one or more clients, such as the client 102 (FIG. 1). The input/output module 520 may be configured to use a wireless interface and/or a wired interface (not shown). The wireless interface may include, but is not limited to, a wireless RF interface (e.g. cellular, PCS, WiFi, Ultrawideband, Bluetooth, satellite transmissions, RFID, etc.), an infrared interface, and the like. The wired interface may include a direct I/O interface, such as a category 5 interface, a serial interface, a USB interface, and the like.

The unpacking module 522 may be configured to extract the clear text SB-C values from authentication exchanges sent by a client, such as client 102. In embodiments where an authentication exchange sent by a client is encoded by the Kerberos protocol, the unpacking module 512 may derive a clear text SB-C value, such as SB-C value 116 (FIG. 1), from a protected canonical name (CNAME) record of a Kerberos service ticket. In embodiments where an authentication exchange sent by a client is encoded by the NTLM protocol, the unpacking module 512 may extract the SB-C value from a protected attribute value pair in an extensible field of a NTML authentication message. In additional embodiments where an authentication exchange is encoded by a Digest protocol, the unpacking module 522 may unpack the SB-C value from a protected directive of a Digest message.

The comparison module 524 may be configured to ascertain whether a clear text CB-C value, as received from a client, e.g., client 102, is a non-default value. In at least one embodiment, comparison module 524 may interpret a non-default CB-C value, as received from a client, to indicate that the client has sent the authentication exchange over a valid outer channel and has verified that the target server is a legitimate recipient.

The comparison module 524 may be further implemented to compare the clear text SB-C values, as received from a client, to a SB-S value that is stored in the target server. As described above, in various embodiments, the SB-S value may be a name of the target server, a value derived from the name of a gateway and known to the target server, a value that includes one or more wild card representations, or some other value that matches a SB-C value. The comparison module 524 may be configured to employ wild card matching, as described in FIG. 4, to match a clear text SB-C value to a SB-S value, as well as employ one-to-one match. Thus, comparison module 524 may direct the target server to establish an authenticated communication channel between the target server and a client, e.g., client 102, when the received CB-value is non-default, and/or the clear text SB-C value matches the SB-S value.

The data storage module 526 is configured to store data in a portion of memory 314 (e.g., a database). In various embodiments, the data storage module 526 may be configured to store a SB-S value, (e.g., a name of a gateway), the domain name that corresponds to the gateway name, service principal name (SPN), ports for forming communication connections, as well as other pertinent information.

In various embodiments, the name of a server unpacked by the unpacking module 522, as well as server names stored in the data storage module 526, may be one of several forms. For example, but not as a limitation, the name may be in NetBIOS form, a full domain name form, and/or other standard naming conventions. Accordingly, the comparison module 524 may be further configured identify the form of the name received from a client, such as the client 102, prior to making a comparison.

Exemplary Processes

Figure 6:
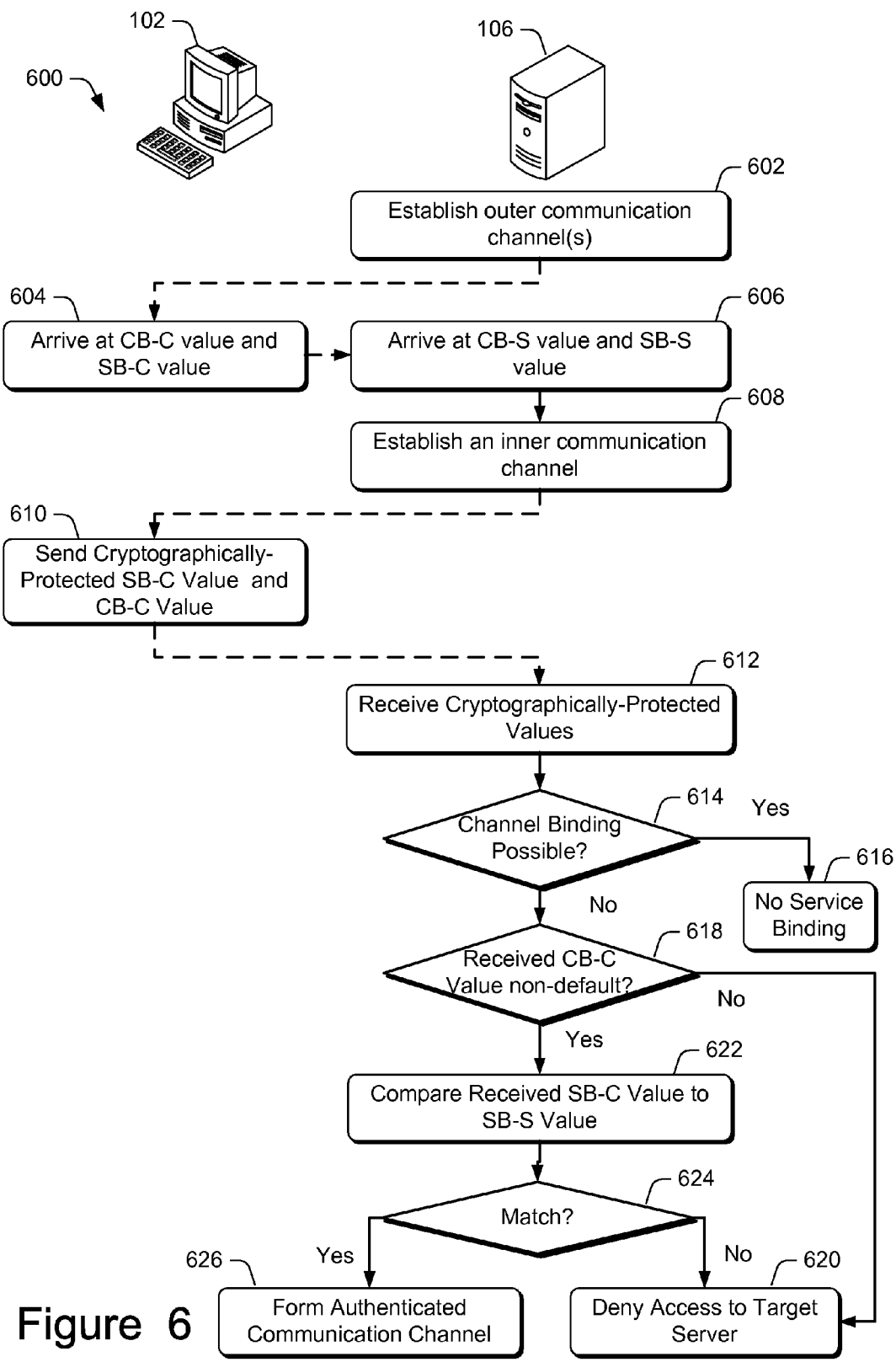
FIG. 6 is a flow diagram illustrating an exemplary process for providing service binding in a network environment, in accordance with various embodiments.

FIG. 6 illustrates an exemplary process 600 that facilitates service binding in a network environment, in accordance with various embodiments. The exemplary process 600 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types.

Furthermore, the order in which the operations are described is not intended to be construed as a limitation, and any number of the described blocks can be combined in any order and/or in parallel to implement the process. For discussion purposes, the processes are described with reference to the exemplary network environments of FIGS. 1-4, although they may be implemented in other system architectures. The exemplary process 600 may include steps that are implemented on any one of the clients described above, such as the client 102, as well as steps that are implemented on any one of the target servers described above, such as the target server 106.

At block 602, one or more outer communication channels may be established. In some embodiments, the one or more established outer communication channels may include an outer communication channel for the client and a gateway that is interspersed between the client and the target server. In other embodiments, the one or more established outer communication channels may include a plurality of outer communication channels connecting the client, the gateway, and the target server. In various embodiments, the outer communication channels may be established using a Transport Layer Security (TLS) protocol and/or the IPSec protocol.

At block 604, the client may arrive at a client service binding (SB-C) value and a client channel binding (CB-C) value. The SB-C value may include the name of a gateway. As described above, the client may derive the name of the gateway after the client validates the certificate of the gateway. Alternatively, the client may obtain a SB-C value from one or more domain name servers (DNS) based on a domain name of a service that the user intends to reach. The CB-C value may be derived from an outer communication channel between the client and the gateway.

At block 606, the target server may arrive at a server service binding (SB-S) value and a server channel binding value (CB-S) value. For example, but not as a limitation, the target server may derive the CB-S value from an outer communication channel between the client and the gateway. In other embodiments, the target server may derive the CB-S value may from a name of a gateway, the gateway being interspersed between the client and the target server. It will be appreciated that blocks 604 and 606 may be implemented in parallel.

At block 608, an inner communication channel may be established between the client and the target server. The inner communication channel may be established based on a NT LAN Manger (NTML) protocol, a Kerberos protocol, or a Digest protocol.

At block 610, the client may send the clear text SB-C value and the CB-C value to the target server via the communication channels. The SB-C and CB-C values may be sent as part of an authentication exchange that seeks to establish an authenticated communication channel between the client and the target server. Both the CB-C value and the clear text SB-C value are cryptographically protected during the transit to the target server. In various embodiments, these values may be protected by a communication protocol mechanism, such as one of a NT LAN Manger (NTML) protocol, a Kerberos protocol, or a Digest protocol.

At block 612, the clear text SB-C value and the CB-C value may be received by the target server over a network environment. The network environment may be one of the network environments 100, 200, or 300. While the clear text SB-C value is cryptographically protected during its transit from the client, it is nevertheless available to the target server in clear text form.

At decision block 614, the target server may determine whether it is able to implement channel binding that binds an inner communication to an outer communication channel. In various embodiments, the target server may be able to implement channel binding if it is able to match the CB-S value to a client channel CB-C value.

For example, with respect to FIG. 1, the target server 106 may match the CB-S value 118 to a CB-C value 110 if the gateway 104 and the target server 106 are actually one server. In which case, the gateway 104, also playing the role of the target server 106, may match the CB-S value 112 to the CB-C value 110 and perform channel binding of the inner communication channel 114 to the outer communication channel 108.

If the target server determines that channel binding may be implemented ("yes" at decision block 614), the process 600 may proceed to block 616. At block 616, the target server may determine that no service binding needs to be performed. However, if the target server determines that it is not able to implement channel binding ("no" at decision block 614, the process 600 may proceed to decision block 618.

At decision block 618, the target server may determine whether the CB-C value received at block 612 is not a default value that would have been used by the client to indicate absence of an outer channel. In various embodiments, the target server may be configured to interpret a non-default CB-C value, as received from a client, to indicate that the client has sent the authentication exchange over a valid outer channel and has verified that the target server or gateway is a legitimate recipient.

Thus, if the target server determines that the received CB-C value is a default value ("no" at decision block 618), the process may process to block 620. At block 620, the target server may deny server access to the client that provided the default CB-C value at block 610. However, if the target server determines that the received CB-C value is non-default ("yes" at decision block 618), the process may process to block 622.

At block 622, the target server may compare the received clear text SB-C value with a server service binding (SB-S) value stored in the target server. In various embodiments, the target server may perform one of a one-to-one matching. Alternatively, the target server may perform a wild card matching of the clear text SB-C value to the stored SB-S value.

At decision block 624, the target server may determine whether the received clear text SB-C value matches the stored SB-S value during the comparison. If the target server determines that the received clear text SB-C value matches the stored SB-S value ("yes" at decision block 624), the process 600 may proceed to block 626.

At block 626, the target server may form an authenticated (i.e., service bound) communication channel to the client that initiated the authentication exchange. However, if the target server determines that the received clear text SB-C value does not match the stored SB-S value ("no" at decision block 624), the process 600 may proceed to block 620.

At block 620, the target server may fail the authentication exchange and deny server access for the client that initiated the authentication exchange.

Exemplary Computing Device

Figure 7:
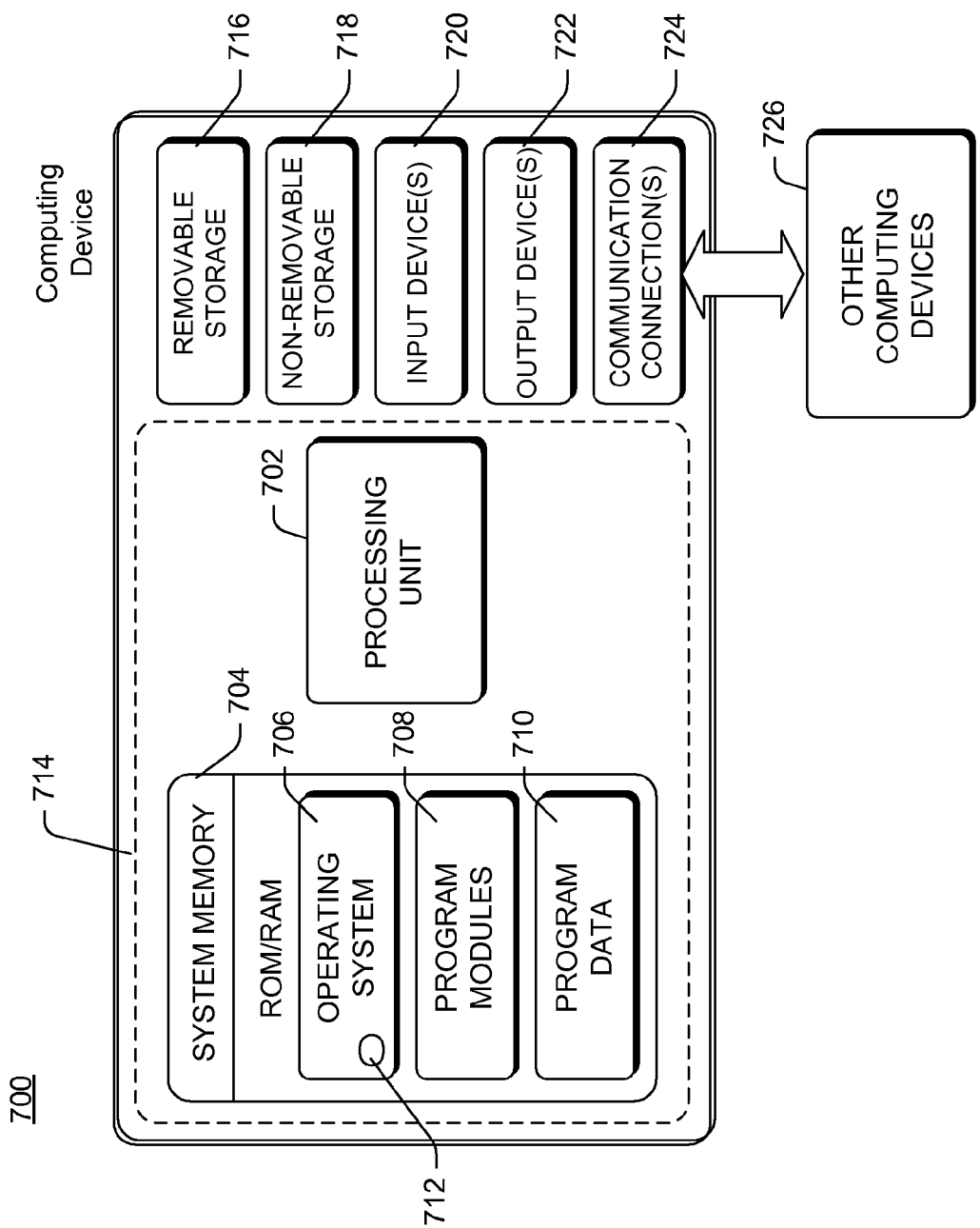
FIG. 7 is a block diagram illustrating a representative computing device. The representative device may be a part of a network environment, in accordance with various embodiments.

FIG. 7 illustrates a representative computing device 700 that may be used to implement the service binding techniques and mechanisms described herein. For example, the clients, gateways, and servers described herein may be implemented on the representative computing device 700. However, it is readily appreciated that the various embodiments of the service binding techniques and mechanisms may be implemented in other computing devices, systems, and environments. The computing device 700 shown in FIG. 7 is only one example of a computing device and is not intended to suggest any limitation as to the scope of use or functionality of the computer and network architectures. Neither should the computing device 700 be interpreted as having any dependency or requirement relating to any one or combination of components illustrated in the example computing device.

In a very basic configuration, computing device 700 typically includes at least one processing unit 702 and system memory 704. Depending on the exact configuration and type of computing device, system memory 704 may be volatile (such as RAM), nonvolatile (such as ROM, flash memory, etc.) or some combination of the two. System memory 704 typically includes an operating system 706, one or more program modules 708, and may include program data 710. The operating system 706 include a component-based framework 712 that supports components (including properties and events), objects, inheritance, polymorphism, reflection, and provides an object-oriented component-based application programming interface (API), such as, but by no means limited to, that of the .NET™ Framework manufactured by Microsoft Corporation, Redmond, Wash. The device 700 is of a very basic configuration demarcated by a dashed line 714. Again, a terminal may have fewer components but will interact with a computing device that may have such a basic configuration.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by removable storage 716 and non-removable storage 718. Computer storage media may include volatile and nonvolatile, removable and non-removable media implemented in any method or technology for storage of information, such as computer readable instructions, data structures, program modules, or other data. System memory 704, removable storage 716 and non-removable storage 718 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 720 such as keyboard, mouse, pen, voice input device, touch input device, etc. Output device(s) 722 such as a display, speakers, printer, etc. may also be included. These devices are well known in the art and are not discussed at length here.

Computing device 700 may also contain communication connections 724 that allow the device to communicate with other computing devices 726, such as over a network. These networks may include wired networks as well as wireless networks. Communication connections 724 are one example of communication media. Communication media may typically be embodied by computer readable instructions, data structures, program modules, etc.

It is appreciated that the illustrated computing device 700 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The establishment of an authenticated communication channels using service binding may enable a client and server to establish a communication channel using a channel-binding like mechanism without any modification to current channel binding systems. For example, service binding may enable communication channels to be established over reverse proxies because of the client service binding (SB-C) values are transmitted to one or more servers in clear text, thereby making it possible to perform wildcard matching. Moreover, the use of server names as the SB-C values may reduce or eliminate the problem of built-in obsolesce and/or expiration associated with binding values derived from server certificates.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

We claim:

1. A method for communication between a client and target server, comprising:
   receiving a clear text client channel binding value and a clear text client service binding value from the client at the target server via a gateway, the clear text client service binding value including a service that the client intends to reach;
   verifying that the clear text client service binding value was transmitted over one or more valid outer communication channels based on the client channel binding value;
   comparing the clear text client service binding value to a server service binding value, wherein the clear text client service binding value includes a gateway name that is known to the target server;
   determining whether the clear text client channel binding value is a non-default value, the non-default value indicating that the client has sent an authentication exchange over a valid outer channel and has verified that the gateway is the intended recipient;
   comparing the clear text client service binding value to the server service binding value to determine if the client service binding value matches the server service binding value; and
   forming an authenticated communication channel between the client and the target server when the client service binding value matches the server service binding value, wherein the forming includes forming the authenticated communication channel between the client and the target server when the client service binding value matches the server service binding value and the client channel binding value is a non-default value.

2. The method for of claim 1, further comprising denying the client access to the target server when the client service binding value does not match the server service binding value.

3. The method of claim 1, wherein the clear text client service binding value is cryptographically protected during a transmission between the client and the target server by one of a Kerberos protocol, NT LAN Management (NTLM) protocol, or Digest authentication protocol.

4. The method for of claim 1, wherein the comparing includes performing a wild card match between the clear text client service binding value and the server service binding value, the server service binding value includes at least one wild card representation.

5. The method of claim 1, further comprising:
forming an outer communication channel between a client and a gateway that is interspersed between the client and a target server via a Transport Security Layer (TLS) protocol,
wherein the receiving includes receiving a clear text client service binding value from a client that has validated a certificate of the gateway, the client service binding value being derived from a name of the gateway.

6. The method of claim 1, wherein the receiving includes receiving a clear text client service binding value on the target server via a canonical name (CNAME) record in a Kerberos service ticket.

7. The method of claim 1, wherein the receiving includes receiving a clear text client service binding value on the target server via an attribute value pair in a NT LAN Manager (NTLM) authentication message.

8. The method of claim 1, wherein the receiving includes receiving a clear text client service binding value on the target server via a Digest directive.

9. One or more computer readable storage devices storing computer-executable instructions which, when executed by one or more processors, cause the one or more processors to perform acts comprising:
receiving a first channel binding value from a client at a gateway;
forming a first outer communication channel between the client and the gateway, the gateway being interspersed between the client and a target server;
sending a second channel binding value from the gateway to the target server;
forming a second outer communication channel between the gateway and the target server;
receiving a client channel binding value and a clear text client service binding value from the client and forwarding the client channel binding value and the clear text client service binding value to the target server at least partially via the first outer communication channel and partially via the second outer communication channel;
determining whether the client channel binding value is a non-default value, the non-default value indicating that the client has sent an authentication exchange over a valid outer channel and has verified that the gateway is an intended recipient;
verifying that the clear text client service binding value was transmitted over the first and second outer communication channels based on the client channel binding value;
comparing the client service binding value to a server service binding value; and
forming an inner communication channel between the client and the target server when the client service binding value matches the server service binding value, wherein the forming the inner communication channel includes forming an authenticated communication channel between the client and the target server when the clear text client service binding value matches the server service binding value and the client channel binding value is a non-default value.

10. The one or more computer readable storage devices of claim 9, wherein at least one of the first and second outer communication channels is established via a Transport Layer Security (TLS) protocol and wherein the receiving includes receiving a clear text client service binding value from a client that has validated a certificate of the gateway, the client service binding value being derived from a name of the gateway.

11. The one or more computer readable storage devices of claim 9, wherein the receiving comprises receiving a clear text client service binding value that is routed to the target server from the client by a domain name server.

12. The one or more computer readable storage devices of claim 9, wherein the comparing includes performing a wild card match between the clear text client service binding value and the server service binding value, the server service binding value includes at least one wild card representation.

13. A computer device, comprising:
an input component to receive a clear text client channel binding value and a clear text client service binding value from a client at a target server, wherein the clear text client service binding value includes a gateway name that is known to the target server;
a comparison component to:
determine whether the clear text client channel binding value is a non-default value, the non-default value indicating that the client has sent an authentication exchange over a valid outer channel and has verified that the target server is an intended recipient;
compare the clear text client service binding value to a server service binding value when the clear text client service binding value was transmitted over one or more valid outer communication channels;
form an inner authenticated communication channel between the client and the target server when the client service binding value matches the server service binding value and the clear text client channel binding value is a non-default value; and
deny the client access to the target server when the client service binding value does not match the server service binding value.

14. The computer device of claim 13, wherein the clear text client service binding value is cryptographically protected during a transmission between the client and the target server by one of a Kerberos protocol, NT LAN Management (NTLM) protocol, or Digest authentication protocol.

15. The computer device of claim 13, further comprising an unpack component to extract a clear text client service binding value from a canonical name (CNAME) record in a Kerberos service ticket.

16. The computer device of claim 13, further comprising an unpack component to extract a clear text client service binding value from an attribute value pair of a NT LAN Manager (NTLM) authentication message.

17. The computer device of claim 13, further comprising an unpack component to extract a clear text client service binding value from a Digest directive.

18. The method for of claim 1, further comprising obtaining the name of the gateway by consulting one or more domain name servers (DNS).

19. The computer device of claim 13, wherein the comparing includes performing a wild card match between the clear text client service binding value and the server service binding value, the server service binding value includes at least one wild card representation.

\* \* \* \* \*